United States Patent
Lustenberger (10) Patent No.: US 10,294,080 B2
(45) Date of Patent: May 21, 2019

(54) PASSENGER-TRANSPORTING SYSTEM WITH A DEVICE FOR DETERMINING THE OPERATING STATE

(71) Applicant: INVENTIO AG, Hergiswil (CH)

(72) Inventor: Ivo Lustenberger, Buttisholz (CH)

(73) Assignee: Inventio AG, Hergiswil (CH)

( * ) Notice: Subject to any disclaimer, the term of this patent is extended or adjusted under 35 U.S.C. 154(b) by 0 days.

(21) Appl. No.: 15/758,562

(22) PCT Filed: Aug. 17, 2016

(86) PCT No.: PCT/EP2016/069468
§ 371 (c)(1),
(2) Date: Mar. 8, 2018

(87) PCT Pub. No.: WO2017/042006
PCT Pub. Date: Mar. 16, 2017

(65) Prior Publication Data
US 2018/0244501 A1  Aug. 30, 2018

(30) Foreign Application Priority Data
Sep. 10, 2015  (EP) ..................................... 15184737

(51) Int. Cl.
*B65B 25/00* (2006.01)
*B66B 25/00* (2006.01)
(Continued)

(52) U.S. Cl.
CPC ................ *B66B 25/00* (2013.01); *B66B 1/32* (2013.01); *B66B 1/3492* (2013.01);
(Continued)

(58) Field of Classification Search
CPC ....... B66B 1/32; B66B 1/3492; B66B 5/0018; B66B 23/00; B66B 23/02; B66B 23/026;
(Continued)

(56) References Cited

U.S. PATENT DOCUMENTS 3,526,300 A * 9/1970 Roger .................... B66B 1/285
                                                                   187/293
4,034,275 A * 7/1977 Mangel .................. G01P 3/486
                                                                   187/289
(Continued)

FOREIGN PATENT DOCUMENTS

DE         4113249 A1   10/1991
EP      1 541 519 B1    6/2005
(Continued)

OTHER PUBLICATIONS

International Search Report for International Application No. PCT/EP2016/069468 dated Nov. 18, 2016.

*Primary Examiner* — Gene O Crawford
*Assistant Examiner* — Keith R Campbell
(74) *Attorney, Agent, or Firm* — Knobbe Martens Olson & Bear LLP (57) ABSTRACT

A device serves for determining the speed of a passenger-transporting system. The device includes an arrangement of auxiliary elements and a sensing device. The arrangement of the auxiliary elements rotates, in a manner corresponding to a movement of the passenger-transporting system. The sensing device can sense whether an auxiliary element is, or is not, located at a certain sensing location. The auxiliary elements are of a first configuration type and a second configuration type. The sensing device can sense whether an auxiliary element is of the first configuration type or of the second configuration type. Furthermore, the sensing device can assign an auxiliary element of the first configuration type and an auxiliary element of the second configuration type to one another such that the direction of rotation can be determined from the order in which the auxiliary elements are sensed.

18 Claims, 3 Drawing Sheets

(51) Int. Cl.
*B66B 27/00* (2006.01)
*B66B 1/34* (2006.01)
*B66B 1/32* (2006.01)
*B66B 5/00* (2006.01)
*B66B 23/02* (2006.01)
*B66B 29/00* (2006.01)
*G01P 3/36* (2006.01)
*G01P 3/486* (2006.01)
*G01P 13/04* (2006.01)

(52) U.S. Cl.
CPC .......... *B66B 5/0018* (2013.01); *B66B 23/026* (2013.01); *B66B 27/00* (2013.01); *B66B 29/00* (2013.01); *G01P 3/36* (2013.01); *G01P 3/486* (2013.01); *G01P 13/04* (2013.01); *G01P 13/045* (2013.01)

(58) Field of Classification Search
CPC ..... B66B 25/00; B66B 25/003; B66B 25/006; B66B 27/00; B66B 29/00; B66B 29/005; G01P 3/36; G01P 3/486; G01P 13/04; G01P 13/045
USPC ................................ 198/321, 322, 323, 330
See application file for complete search history.

(56) References Cited

U.S. PATENT DOCUMENTS

| | | | | |
|---|---|---|---|---|
| 4,322,712 A | * | 3/1982 | Yoshida | B66B 1/3492 187/287 |
| 4,586,587 A | * | 5/1986 | Grossi | B66B 1/32 187/293 |
| 5,074,275 A | | 12/1991 | Fukui | |
| 5,230,418 A | * | 7/1993 | Agnoff | G01P 3/486 198/502.4 |
| 5,939,879 A | * | 8/1999 | Wingate | G01D 5/202 324/207.17 |
| 6,002,249 A | * | 12/1999 | Futsuhara | G01D 5/244 250/231.14 |
| 6,622,110 B2 | * | 9/2003 | Fujita | G01D 5/244 702/142 |
| 6,734,418 B2 | * | 5/2004 | Hashimoto | G01D 5/2492 250/231.14 |
| 2014/0367206 A1 | * | 12/2014 | Della Porta | B66B 5/06 187/305 |

FOREIGN PATENT DOCUMENTS

| | | | | | |
|---|---|---|---|---|---|
| JP | 6176960 A | * | 4/1986 | | G01P 3/486 |
| JP | 10129946 | * | 5/1998 | | |
| JP | H10129946 A | | 5/1998 | | |

* cited by examiner

PASSENGER-TRANSPORTING SYSTEM WITH A DEVICE FOR DETERMINING THE OPERATING STATE

TECHNICAL FIELD

The invention relates to a passenger-transporting system that is designed in the form of an elevator, an escalator or a moving sidewalk, comprising a device for determining the operating state, and to a method for determining the operating state, in particular for measuring speed, that is used for a passenger-transporting system designed in the form of an elevator, an escalator or a moving sidewalk.

DESCRIPTION OF RELATED ART

EP 1 541 519 B1 discloses a passenger transport device which comprises a radar sensor for detecting approaching users. In this case, in order to transport a person, the speed is increased from a lower value to a normal speed. In order to correctly control the drive, it must be possible to sense the speed of the step belt or pallet belt.

In order to determine the speed, it is conceivable to use drive motors comprising integrated encoders. Drive motors of this kind are disadvantageous due to additional specialization of the design thereof, on account of the additional encoder, which leads to high costs.

SUMMARY

An object of the invention is to propose a simply designed and cost-effective device that makes it possible to determine an operating state, in particular to measure a speed, in a passenger-transporting system that is designed in the form of an elevator, an escalator or a moving sidewalk, and a method for determining the operating state, in particular for measuring speed, that is used for a passenger-transporting system designed in the form of an elevator, an escalator or a moving sidewalk and which can be implemented by such a device. In particular, an object of the invention is to specify such a device, such a passenger-transporting system and such a method which allow improved determination of the operating state, in particular, permitting a direction-dependent speed measurement.

Solutions and proposals for a passenger-transporting system comprising a corresponding device, and a corresponding method, are hereinafter presented that achieve at least parts of one of the objects. In addition, advantageous, supplemental or alternative developments and embodiments are specified.

Developments will be set out in the following in particular with reference to a preferred embodiment, in which the auxiliary elements are formed as optical auxiliary elements. However, it will be understood that developments are also possible in a corresponding manner in embodiments in which the auxiliary elements are formed in another manner, for example as auxiliary elements that can be sensed inductively. The same applies for the sensing device and the manner in which the auxiliary elements are sensed.

The device for determining the operating state uses an appropriate number of optical auxiliary elements which can be attached to or formed on the flywheel of the drive motor, on a wheel of the drive motor or the like in a suitable manner. In this way, cost-effective drive motors can be used, in which the flywheel is optionally modified appropriately. For example, the flywheel of the drive motor may be designed such that the optical auxiliary elements are arranged on the flywheel in the form of holes or as fitted metal plates. These holes or other optical auxiliary elements can be scanned constantly by the optical sensing device, from which pulses can be generated. A speed can be measured from this pulsed image or signal curve. This speed measurement is also carried out independently of the direction of rotation.

For this purpose, the device for determining the operating state comprises an arrangement made up of optical auxiliary elements and at least one optical sensing device, the arrangement made up of the optical auxiliary elements rotating about an axis of rotation in accordance with a movement of at least one transporting element of the passenger-transporting system. The arrangement made up of the optical auxiliary elements is configured and the optical sensing device is assigned to the optical auxiliary elements such that all the auxiliary elements can be sensed by the same sensing device and identified in the same signal curve of the sensing device. The optical sensing device can sense whether or not an optical auxiliary element is currently located at a certain sensing location. At least one of the optical auxiliary elements is configured in a manner corresponding to a first configuration type, and at least one second optical auxiliary element is configured at least in a manner corresponding to a second configuration type, the sensing device being able to sense, at least when the arrangement made up of the auxiliary elements is rotated, whether an optical auxiliary element located at a certain sensing location is of the first configuration type or the second configuration type. When the arrangement made up of the optical auxiliary elements is rotated, the sensing device can assign at least one auxiliary element of the first configuration type and at least one auxiliary element of the second configuration type to one another such that the direction of rotation of the arrangement made up of auxiliary elements can be determined from the defined sensing of auxiliary elements of the first configuration type and of the second configuration type.

The significant advantage of the present invention is that the different configuration types of the auxiliary elements mean that just one sensing device is required and that both the speed and the direction of rotation can be ascertained from the same signal curve. This reduces the costs relating to the device for determining the operating state and an analysis device which only must process one signal curve and not simultaneously process a plurality of signal curves of the device for determining the operating state.

Defined sensing is to be understood to mean that the analysis device can ascertain, from the pulse widths of the pulses generated by the auxiliary elements, for example the sequence in which the optical auxiliary element of the first configuration type and the optical auxiliary element of the second configuration type are sensed. In this case, for example previously sensed pulse widths and previously ascertained speed values and the changes thereof can also be consulted and extrapolated such that these calculated, anticipated pulse widths can be compared with the measured pulse widths in order to verify the result.

For this purpose, the passenger-transporting system that is designed in the form of an elevator, an escalator or a moving sidewalk comprises such a device. For this purpose, the method for determining the operating state, in particular for measuring speed, which method is used for a passenger-transporting system designed in the form of an elevator, an escalator or a moving sidewalk and can be implemented using such a mentioned device, senses whether or not an optical auxiliary element is currently located at a certain sensing location, further senses whether an auxiliary element currently located at the certain sensing location is of a first configuration type or of a second configuration type, assigns at least one optical auxiliary element of the first configuration type and at least one optical auxiliary element of the second configuration type to one another when the arrangement made up of the optical auxiliary elements is rotated, and determines the direction of rotation of the arrangement from the sequence in which the optical auxiliary element of the first configuration type and the optical auxiliary element of the second configuration type, which elements are assigned to one another, are sensed.

It is advantageous for the arrangement made up of the optical auxiliary elements to be formed by arranging the optical auxiliary elements on a flywheel of the drive motor or on a wheel of the power train that is driven by the drive motor or by a movement of the transporting element.

Thus, the flywheel of the drive motor, if such a flywheel is provided, or another wheel of the power train that rotates when the transporting element moves and that is provided anyway, can be used to implement the rotatable arrangement made up of the optical auxiliary elements. As a result, there are numerous options that allow a wide range of application and that use a rotating component of the escalator, of the moving sidewalk or of the elevator that is provided anyway. In this case, the optical auxiliary elements can be selected or configured in a suitable manner in relation to the relevant application.

In one possible embodiment, it is advantageous for the optical auxiliary elements to be formed as transparent optical auxiliary elements and/or as light-reflecting optical auxiliary elements. In the case of a configuration as transparent optical auxiliary elements, a configuration in the form of openings, in particular holes, is conceivable. A plurality of, in particular two, configuration types can then be achieved using the size of the opening. It is furthermore possible to provide light-reflecting optical auxiliary elements of different sizes in order to allow such a differentiation. In this case, a light-reflecting optical auxiliary element can be achieved by corresponding surface treatment and optional coating of the flywheel or the like. An embodiment is also conceivable, however, in which a light-reflecting optical auxiliary element of this kind in the form of a mirror is connected to the flywheel or the like in a suitable manner. Moreover, a combination of options of this kind is conceivable.

It should be noted that the transporting element, the speed of which is determined in a direction-dependent manner, is preferably an elevator car, an escalator step or a moving sidewalk pallet, depending on the design of the passenger-transporting system. In this case, the reference to at least one transporting element is intended to be understood such that, in relation to the relevant application, in particular in an escalator and in a moving sidewalk, but optionally also in an elevator, a plurality of transporting elements are provided that are moved together at the same speed and in the same direction. A step belt or a pallet belt is thus formed, it being possible to determine the speed and the movement direction of a step belt or pallet belt using the device. For further step belts or pallet belts, and optionally elevator cars, that are independent thereof, a further device for determining the operating state, in particular for measuring speed, can be provided.

It is advantageous for the arrangement made up of the auxiliary elements to be configured such that the centers of area of the optical auxiliary elements are arranged at least approximately on the radius, relative to the axis of rotation, on which the sensing location is located, and that the optical sensing device is configured such that the sensing occurs at the sensing location at a resolution in the peripheral direction that allows the optical auxiliary elements to be assigned to the first configuration type and to the second configuration type. For example, the sensing device may comprise a light-sensitive element, in particular a photodiode, in front of which an aperture is arranged. The resolution can be adjusted by means of the size of the aperture opening, in order to limit the influence of stray light from a suitable light source that radiates onto the light-sensitive element through or over the optical auxiliary element. In particular when two optical auxiliary elements are arranged close to one another, this also achieves a sufficiently sharp separation of the optical auxiliary elements from one another.

The optical auxiliary elements of the first configuration type and the optical auxiliary elements of the second configuration type advantageously differ on account of having different extensions in the peripheral direction on the radius, relative to the axis of rotation, on which the sensing location is located. This results in a different pulse duration for the optical auxiliary elements of the different configuration types at a specified rotational speed. In this case, the different extensions in the peripheral direction are specified such that there is a sufficiently large difference between the successive pulses even when there are changes in the rotational speed. Although the pulse duration ideally halves when the rotational speed doubles, the ratio of the pulse durations of two specified, closely successive optical auxiliary elements remain approximately constant even during the change in the rotational speed. Taking account of the requirements described above, the optical auxiliary elements can in principle be of any shape.

Advantageously, the optical auxiliary elements are at least approximately circular, the optical auxiliary elements of the first configuration type and the optical auxiliary elements of the second configuration type differing on account of different circle radii of the circular configurations thereof. For example, the optical auxiliary elements may be formed by holes in the flywheel, different hole diameters being provided for the different configuration types. For example, the hole diameter of a first configuration type and of a second configuration type can differ by a factor of 2. During operation, there is then at least approximately a difference in the pulse width that corresponds to the specified factor, for example the factor of 2.

In a modified embodiment, the optical auxiliary elements can advantageously be at least approximately elliptical, the optical auxiliary elements of the first configuration type and the optical auxiliary elements of the second configuration type differing on account of different major and minor axes that are oriented in the peripheral direction. In this embodiment, the axis of the ellipse that is oriented in the peripheral direction is therefore decisive, said axis being the major or minor axis. In this case, it is possible to also achieve congruent configurations for the first configuration type and the second configuration type for example, if on one occasion the major axis and on the next occasion the minor axis is oriented in the peripheral direction.

In a further possible embodiment, the optical auxiliary elements of one configuration type are at least approximately elliptical and those of the other configuration type are at least approximately circular, the major or minor axis, oriented in the peripheral direction, of the elliptical configuration of the optical auxiliary elements of one configuration type, and a diameter of the optical auxiliary elements of the other configuration type being specified so as to be of different sizes. In this embodiment, it is in particular conceivable for the elliptical configuration to have an extension which is correspondingly perpendicular to the peripheral direction, with respect to the axis, i.e. the major or minor axis, that is not oriented in the peripheral direction, and which extension is equal to the diameter of the optical auxiliary elements of the other configuration type. As a result, in particular comparable signal strengths, but also different pulse durations, can be achieved by the different configuration types.

Of course, polygonal or curved shapes, such as a curved slot for example, can also be implemented instead of circular or elliptical shapes.

It will be understood that more than two configuration types could also be implemented, different combinations being conceivable for configuring the optical auxiliary elements. However, the direction of rotation can be determined using just two different configuration types of the optical auxiliary elements, and in addition it is preferable for precisely or only two different configuration types to be implemented. However, this advantageous implementation includes the option of providing one, two or even more optical auxiliary elements of each configuration type. As the number of the optical auxiliary elements that are provided, depending on the configuration type, increases, the frequency of the measuring signal increases at a specified rotational speed of the arrangement made up of the optical auxiliary elements that rotate about the axis of rotation thereof. This may be advantageous inter alia also for obtaining further information, for example in order to identify a standstill, i.e. a speed of zero, or the beginning of a movement from a standstill.

When the arrangement made up of the optical auxiliary elements is rotated, it is advantageous for the sensing device to temporally assign a first optical auxiliary element of the first configuration type and a second optical auxiliary element of the second configuration type to one another, on the basis of temporal spacings between the successive optical auxiliary elements, in order to determine the direction of rotation of the arrangement. In this case, optical auxiliary elements of precisely two configuration types are preferably provided, the optical auxiliary elements of the two configuration types being distributed in a non-uniform manner in the peripheral direction. More preferably, in this case, the optical auxiliary elements of the two configuration types, which elements are to be assigned to one another in each case, are arranged close together on the periphery on which the sensing location is located. In this case, a specific spacing is preferably provided between the two optical auxiliary elements, which spacing may, depending on the configuration, also be essential, in order to allow a corresponding resolution. Said spacing can for example be specified to be of such a size as to be approximately equal to the smaller extension, viewed in the peripheral direction, of the two optical auxiliary elements.

It is advantageous for the sensing device to temporally assign the first optical auxiliary element and the second optical auxiliary element to one another such that the second optical auxiliary element is assigned to the preceding first optical auxiliary element when the temporal spacing between said first optical auxiliary element and said second optical auxiliary element is shorter than the temporal spacing between the second optical auxiliary element and a following optical auxiliary element of the first configuration type.

It is advantageous furthermore for the first optical auxiliary element to be assigned to the preceding second optical auxiliary element when the temporal spacing between said second optical auxiliary element and said first optical auxiliary element is shorter than the temporal spacing between the first optical auxiliary element and a following optical auxiliary element of the second configuration type. An assignment, in particular a paired assignment, is thus made between the closely adjacent optical auxiliary elements. The direction of rotation can then be found from the sequence, in particular the sequence or order of the pairing. A possibility for determining the current direction of rotation is thus specified which is easy to implement, in particular on a flywheel of a drive motor or the like. Moreover, the signals obtained can advantageously be processed further in order to obtain further information.

It is also advantageous for a plurality of optical auxiliary elements of the first configuration type and a plurality of optical auxiliary elements of the second optical configuration type to be provided, which elements are arranged alternately, in terms of the configuration types thereof, in the peripheral direction. Thus, during operation, a signal that is also easy to analyze can be obtained in a simple manner by using optical auxiliary elements of precisely two configuration types. In an embodiment of this kind, it may be sufficient, for example, to merely analyze the spacings between the auxiliary elements in order to assign the optical auxiliary elements, and to merely analyze the pulse width in order to determine the type of the auxiliary element, these analyses each being possible by simply comparing successive values. Significant optimization is thus achieved both with regard to the necessary processing capacity and to the necessary memory requirements, without the total number of optical auxiliary elements being limited thereby. In particular, a suitable number of pairs of optical auxiliary elements of the first and second configuration type can be distributed at regular spacings over the periphery on which the sensing location is located. In particular in the case of a configuration of the optical auxiliary elements that results in a local change in weight, such as in the case of holes or additionally fastened optical auxiliary elements, a symmetrical arrangement can thus be achieved. Unbalance can thus be prevented. It is therefore advantageous for the arrangement made up of the optical auxiliary elements to be formed, in this manner or in another manner, so as to be axisymmetric.

Moreover, it is thus advantageous for a processing device to be provided which is used to compute information relating to an operating state from temporal spacings between mutually assigned optical auxiliary elements which are sensed by the sensing device at the sensing location, and/or from temporal spacings between mutually unassigned optical auxiliary elements that are sensed by the sensing device at the sensing location, for this information to preferably comprise a speed value for the transporting element and/or an acceleration value for the transporting element and/or an item of standstill information relating the transporting element, and for the processing device to preferably continuously update said information and/or to preferably compare at least two items of information with one another for monitoring purposes. If, for example, pairs of two optical auxiliary elements of the first and of the second configuration type in each case are distributed uniformly over the periphery on which sensing occurs, the spacings between the pairs can then be used to determine the rotational speed and/or a change in the rotational speed and/or a standstill of the arrangement made up of the optical auxiliary elements. Since the arrangement is arranged on the flywheel of the drive motor unit for example, the speed value or the acceleration value or the standstill information for the transporting element generally results directly by means of a simple conversion using a conversion factor. In this case, the standstill information can be obtained such that the time during which no change occurs at the sensing location is measured, and a standstill is identified when a specified threshold is exceeded. No change in the sensing occurs either when there is continuously no optical auxiliary element sensed at the sensing location or when an optical auxiliary element is continuously sensed at the sensing location. In the embodiment already mentioned and given by way of example, the threshold can then be correspondingly reduced as the number of pairs of optical auxiliary elements increases. The resolution for the standstill information can thus be refined, within practical limits. When a monitoring comparison is carried out, two successively ascertained speed values, for example, may be used in order to identify possible measuring errors or in order to increase the measuring accuracy.

It is advantageous to provide a service brake and a controller that allows the service brake to be actuated, and for the controller to actuate the service brake for a specified braking procedure on the basis of the information, determined by the processing device, relating to the operating state, such that the transporting element stops in a specified position. In this case, the specified braking procedure may be the only normal braking procedure. However, the specified braking procedure need not be the only possible braking procedure, since the service brake can optionally also be actuated, in a different manner, for an emergency stop or the like. Stopping the transporting element in a specified position is intended to be understood to mean that, in a passenger-transporting system designed in the form of an escalator or as a moving sidewalk, one of the transporting elements of a step band or of a pallet band, respectively, reaches a preferred position that generally relates to entering or exiting. For example, a defined step stop may be desired in a step belt of an escalator (escalator) in order that an escalator that is at a standstill can be used as a normal staircase without there being step rise differences or the like. In order to reach a specified position of the steps upon standstill, for example a step gap of the step band can be exactly aligned with the related comb plate. The obtained information can thus be used advantageously in order to activate the service brake such that the step band of the escalator stops in the specified position.

In a modified embodiment, the auxiliary elements may also be sensed in a non-optical manner. If the auxiliary elements are formed as holes or by fitted metal plates, for example, said elements can also be scanned using an inductive sensor that generates pulses therefrom. The auxiliary elements can then be formed as depressions and/or openings and/or fitted metal plates, in order to locally form a point that causes changes on the periphery of the sensing location that can be sensed inductively. The sensing device is then preferably configured such that the auxiliary elements can be scanned by an inductive sensor and thus sensed inductively.

Therefore, in a preferred variant, the flywheel of the drive motor can be provided with holes for the purpose of measuring speed. Fitted metal plates that are attached to the flywheel can also be used for measuring speed. The holes or metal plates may be constantly scanned by an inductive sensor that generates pulses therefrom. A pulse image that is dependent on the direction of rotation thus results in the manner described, and this is possible by means of inductively effective auxiliary elements in a manner corresponding to an embodiment comprising optical auxiliary elements.

Identification of the direction of rotation or direction of travel can thus be added to the speed measurement without the need to significantly adapt the fundamental method and the components used.

Moreover, for the reasons already mentioned, one or more additional functions can be implemented without significant additional outlay. In this case, the computing power and memory capacity of microprocessors and data memory units that are cheaply available today can be used, which microprocessors and data memory units are generally installed in modern passenger-transporting systems, in particular escalators and moving sidewalks, anyway. Thus, further information can be calculated from the pulse image, which information can be used, in addition to the speed and the direction of rotation, for control functions, for maintenance and for fault locating or the like.

Regarding the generation of the pulse image, the sensing device can also be configured so as to be cost-effective. In particular, the sensing device may be based on just one sensor. In this case, particularly cost-effective sensors, such as a light-sensitive element, in particular a photodiode, can also be used. In this connection, this may be implemented in particular in accordance with the principle of a light barrier. It is thus possible to achieve significantly more cost-effective solutions than are possible using an encoder for example.

Moreover, modifications of the principle of a simple light barrier are also possible. For example, the auxiliary elements can also be implemented in different configuration types in that said configuration types result in different signal intensities. For example, a light beam that is guided over the auxiliary elements and scanned by the sensing device may pass through a gray filter in one configuration type, while a gray filter of this kind is not provided in the other configuration type. In this case, the amplitudes of the individual pulses of the electrical signal generated differ. Since, preferably, the pulses of an assigned pair of auxiliary elements (or an assigned sequence of auxiliary elements, if more than two auxiliary elements may be assigned to one another) are preferably arranged close together and can thus be sensed in immediate succession, a pulse comparison can generally be carried out with regard to one or more properties in order to decide which pulse originates from which configuration type. Relative decision criteria can thus be used that have the advantage that no reference value is required with regard thereto. The device can thus also tolerate possible detuning, temperature drift and the like.

BRIEF DESCRIPTION OF THE DRAWINGS

Preferred embodiments of the invention are explained in more detail in the description below on the basis of the attached drawings in which corresponding elements are denoted by the same reference numbers. The following is shown.

DETAILED DESCRIPTION

Figure 1:
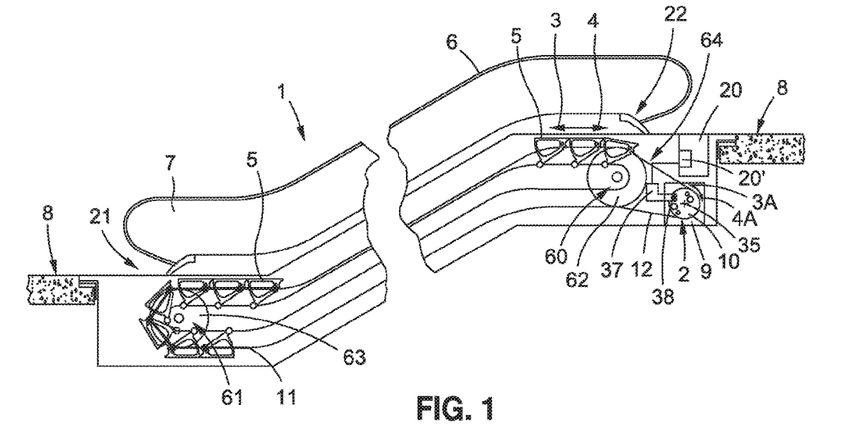
FIG. 1 shows a partial, schematic illustration of a passenger-transporting system that is designed in the form of an escalator and comprises a device for determining the operating state, in particular for measuring speed, corresponding to a first embodiment of the invention.

FIG. 1 shows a partial, schematic illustration of a passenger-transporting system 1 comprising a device 2 for determining the operating state, corresponding to a first embodiment. The passenger-transporting system 1 is designed, by way of example, in the form of an escalator 1. In a modified embodiment, the passenger-transporting system 1 may also, however, be designed in the form of a moving sidewalk. Moreover, the device 2 can optionally be used, in a suitable manner, for determining an operating state in an elevator. The device 2 is used in particular for measuring speed. In this case, the device 2 allows further information to be determined, and in particular allows the current movement direction 3, 4 of a transporting element 5 of the passenger-transporting system 1 to be determined.

The transporting element 5 is configured in a manner corresponding to the design of the passenger-transporting system 1. It will be understood that a revolving step band or pallet band, respectively, is provided in escalators or moving sidewalks, such a transporting element 5 being considered in this case, by way of example, to be an element of the step band or pallet band. In a conceivable embodiment of the passenger-transporting system 1 as an elevator 1, the transporting element 5 is the elevator car.

The passenger-transporting system 1 comprises at least one handrail 6 and at least one balustrade 7. The handrail 6 and the balustrade 7 are located at least substantially above the floors 8 of a building. In this embodiment, a drive motor unit 9 is provided below the floor 8, a suitable pit being formed for this purpose. The drive motor unit 9 comprises an electric drive motor and a flywheel 10. The flywheel 10 cooperates with at least one traction means 11 that transmits the tractive force of the drive motor unit 9 to the transporting element 5. In the embodiment shown, the at least one traction means 11 and a plurality of transporting elements 5 arranged therearound together form the step belt which is guided in a revolving manner over deflection wheels 62, 63 between two deflection regions 60, 61. The deflection wheel 62 connected to the drive motor unit 9 is part of a power train 64.

In this case, appropriate modifications are conceivable in which another wheel 10 is used instead of the flywheel 10. A wheel 10 of this kind may also be a wheel 10 of the power train 64 or the deflection wheel 62 for example, which wheel is part of a reduction gear of the passenger-transporting system 1 and rotates in accordance with a movement of the transporting element 5.

In this embodiment, a rotation of the flywheel 10 in one direction of rotation 3A causes a movement of the transporting element 5 in the movement direction 3. Accordingly, the transporting element 5 moves in the movement direction 4 when the flywheel 10 rotates in the direction of rotation 4A. For this purpose, a suitable connection 12 or coupling 12 is produced between the transporting element 5 and the traction means 11, which connection or coupling exists, depending on the design of the passenger-transporting system 1, either over a limited transport path or permanently, as is the case in an elevator.

In the following, the passenger-transporting system 1 will also be explained in greater detail with reference to FIG. 2 which is a further detail.

Figure 2:
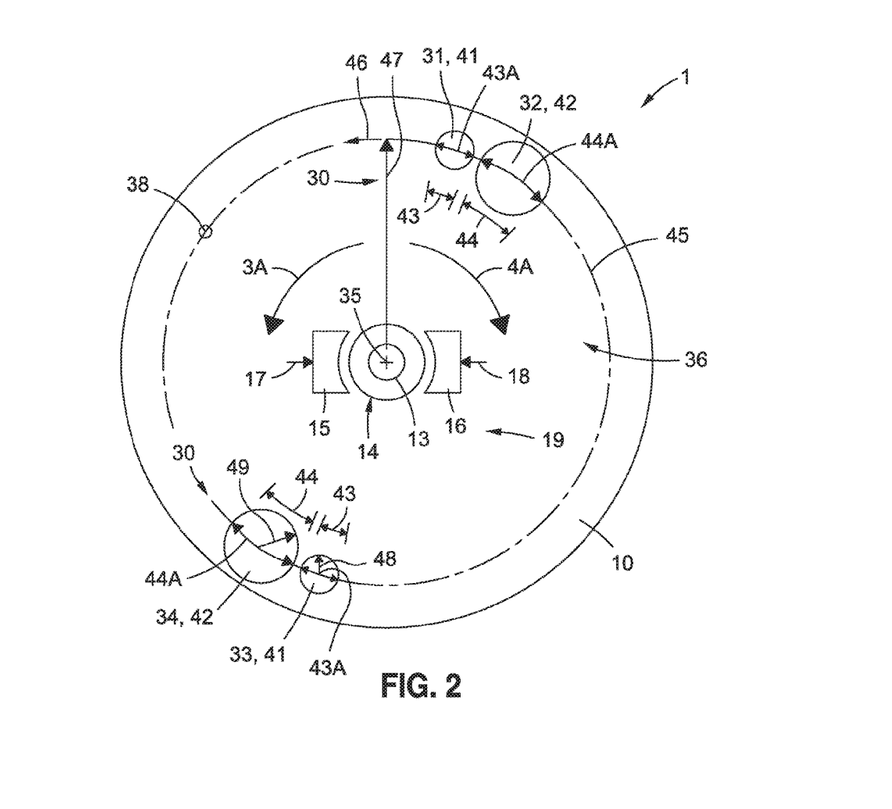
FIG. 2 is a detail of the passenger-transporting system shown in FIG. 1, corresponding to the first embodiment of the invention.

FIG. 2 is a detail of the passenger-transporting system 1 shown in FIG. 1, corresponding to the first embodiment. The flywheel 10, that is driven by an output shaft 13 of the drive motor unit 9, is shown in this case. In addition, a braking path 14 is implemented schematically on the output shaft 13. Brake shoes 15, 16 can be pressed onto the braking path 14 by means of the contact pressures 17, 18 in order to brake the flywheel 10. A service brake 19 is thus achieved. In this case, the service brake 19 can be actuated by a controller 20 of the passenger-transporting system 1. During operation of the passenger-transporting system 1, it may be expedient for the moved transporting element 5 to come to rest, with a desired braking force, at a specified point. This relates, for example, to the case in which the transporting element 5 comes to rest due to the braking at one of the end regions 21, 22 at which entering or exiting occurs. It should be noted that, in the case of an escalator or a moving sidewalk, this generally relates to at least one transporting element 5 of the revolving step belt or pallet belt, respectively.

The device 2 for determining the operating state comprises an arrangement 30 of auxiliary elements 31 to 34. In this embodiment, the auxiliary elements 31 to 34 are configured as optical auxiliary elements 31 to 34, and this is a preferred embodiment. In this case, the auxiliary elements 31 to 34 can rotate about the axis of rotation 35 of the arrangement 30. In this case, the arrangement 30 of the auxiliary elements 31 to 34 rotates such that, inter alia, the spacings between the auxiliary elements 31 to 34 is constant and the configuration of the individual auxiliary elements 31 to 34 within the arrangement 30 is unchanged. There is therefore no position change or relative rotation of individual auxiliary elements 31 to 34 with respect to other auxiliary elements 31 to 34 of the arrangement 30.

The auxiliary elements 31 to 34 may be formed as transparent optical auxiliary elements 31 to 34 or as light-reflecting optical auxiliary elements 31 to 34. For example, the auxiliary elements 31 to 34 may be formed by holes in the wheel 10. Furthermore, the optical auxiliary elements 31 to 34 may be formed by mirrors 31 to 34 that are formed on one side 36 of the wheel 10. The auxiliary elements 31 to 34 can of course also be painted on the wheel, for example using reflective or matt black paint.

Auxiliary elements 31 to 34 that are formed as mirror elements 31 to 34 can also be manufactured and distributed independently of the wheel 10. It is conceivable, for example, for a ring comprising light-reflecting optical auxiliary elements 31 to 34 to be glued to the side 36 of the wheel 10 in order to integrate the auxiliary elements 31 to 34 in the passenger-transporting system 1.

The device 2 further comprises a sensing device 37 which can sense whether or not one of the auxiliary elements 31 to 34 is currently located at a certain sensing location 38. In this case, the sensing location 38 is located such that the auxiliary elements 31 to 34 pass the sensing location 38 in succession when the arrangement 30 is rotated. For example, the sensing device 37 may comprise a light-sensitive diode, whereby, in accordance with the principle of a light barrier, the auxiliary elements 31 to 34 allow the emitted radiation of a light-emitting diode to pass through, while the wheel 10 otherwise blocks the radiation.

In an embodiment of this kind, the sensing device 37 can thus sense, in an optical manner, whether or not one of the auxiliary elements 31 to 34 is currently located at the sensing location 38. In a modified embodiment, the sensing device 37 can sense, in an inductive manner, whether or not one of the auxiliary elements 31 to 34 is currently located at the sensing location 38. The auxiliary elements 31 to 34 may then be formed for example as depressions and/or openings and/or fitted metal plates that are fastened to the side 36.

In this embodiment, the auxiliary elements 31 to 34 are configured in two different ways, resulting in configuration types 41, 42. In this case, the configuration of the auxiliary elements 31, 33 corresponds to the configuration type referred to here by way of example as the first configuration type 41. Moreover, the configuration of the auxiliary elements 32, 34 corresponds to the configuration type referred to here by way of example as the second configuration type 42.

A significant difference between the configuration types 41, 42 relates to a first angle 43 and a second angle 44 over which the auxiliary elements 31 to 34 of the configuration types 41, 42 extend on a peripheral line 45 (shown broken) on which the sensing location 38 is located. In this case, the first angle 43 that is a property of the first configuration type 41 is implemented twice, specifically for the auxiliary elements 31, 33. Correspondingly, the second angle 44 that is a property of second first configuration type 42 is implemented twice, specifically for the auxiliary elements 32, 34. The first angle 43 corresponds to a first extension 43A along the periphery 45 or the peripheral line 45, and therefore the auxiliary elements 31, 33 have a first extension 43A in (any) peripheral direction 46 on the radius 47, relative to the axis of rotation 35, on which the sensing location 38 is located. Correspondingly, the second angle 44 results in a second extension 44A on the peripheral line 45 or in the peripheral direction 46 on the radius 47, relative to the axis of rotation 35, for the auxiliary elements 32, 34 of the second configuration type 42.

In this embodiment, the auxiliary elements 31 to 34 are circular, the configuration types 41, 42 differing on account of different circle radii 48, 49 of the circular configuration types 41, 42 thereof. For example, the circle radii 48, 49 may be specified such that the second angle 44 is twice the size of the first angle 43 or such that the second extension 44A along the peripheral line 45 is twice as long as the first extension 43A along the peripheral line 45.

The extensions 43A, 44A of the auxiliary elements 31 to 34 along the peripheral line 45 or in the peripheral direction 46, which correspond to the angles 43, 44, are therefore a significant property of the different configuration types 41, 42. This significant property can also be achieved in another manner and is not limited to the described circular geometry of the configuration types 41, 42. However, circular configurations make it possible to form the auxiliary elements 31 to 34 in the form of holes that are each centered on the peripheral line 45. A further possible variant is shown in FIG. 3 and described in the following.

Figure 3:
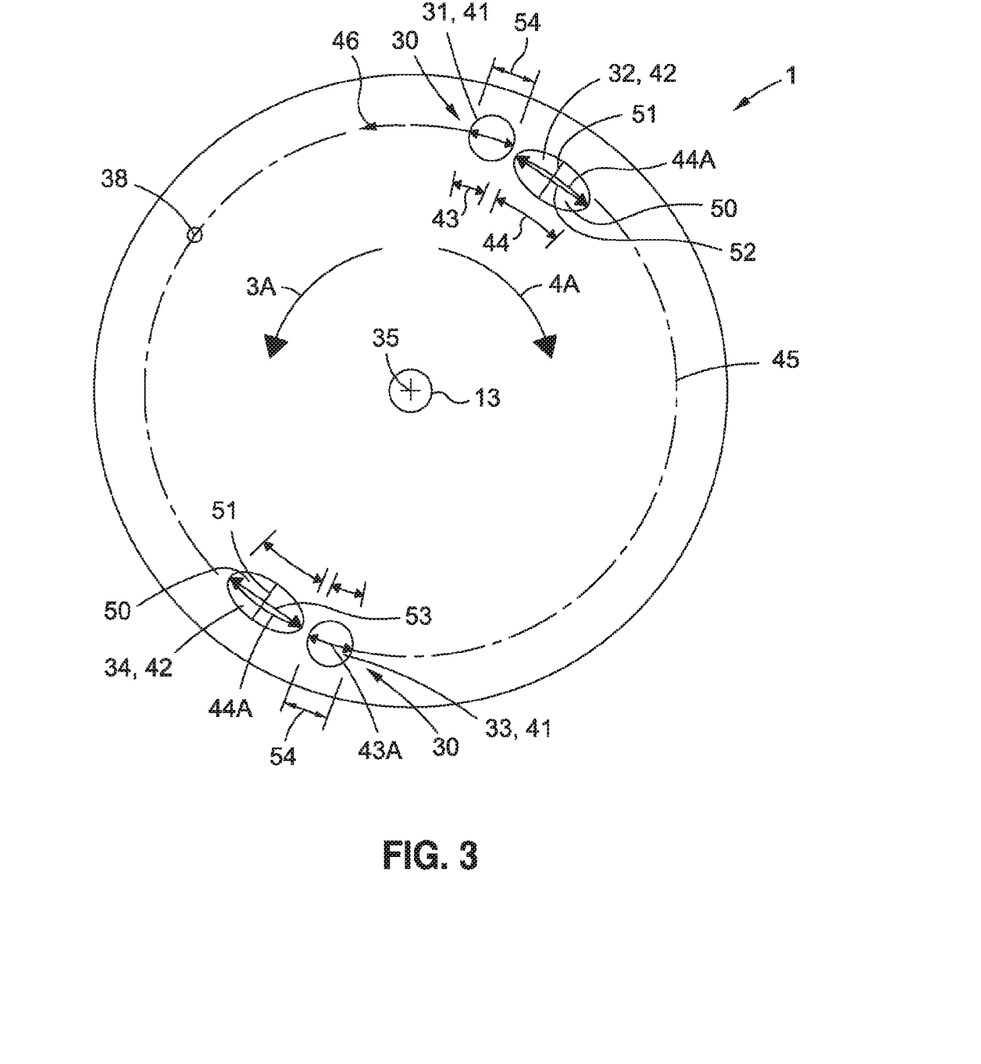
FIG. 3 is a detail of the passenger-transporting system shown in FIG. 1, corresponding to a second embodiment of the invention.

FIG. 3 is a detail of the passenger-transporting system 1 shown in FIG. 1, corresponding to a second embodiment of the invention. In this embodiment, the auxiliary elements 31, 33 are circular, in accordance with the first configuration type 41 described with reference to FIG. 2. However, a modified configuration is implemented for the second configuration type 42 that relates to the auxiliary elements 32, 34. In this case, an elliptical configuration is provided in this embodiment, which configuration is characterized by a major axis 50 and a minor axis 51. In this case, the major axis 50 is oriented perpendicularly to the radius 47. Correspondingly, the minor axis 51 is oriented perpendicularly to the peripheral line 45 or perpendicularly to the peripheral direction 46. Care should be taken in this case to ensure that the major axis 50 and the minor axis 51 do not intersect precisely on the peripheral line 45, but instead that, in this embodiment, the relevant intersection point 52, 53 is offset slightly radially inwards from the peripheral line 45, as a result of which the peripheral line 45 intersects a vertex of the ellipse in each case.

Further modifications are conceivable in this case. For example, an embodiment is also possible in which both configuration types 41, 42 are implemented by ellipses. Furthermore, the major axis 50 can also intersect the peripheral line 45 perpendicularly, such that the ellipses of the second configuration type 42 are each rotated by 90° relative to the view shown in FIG. 3.

In the second embodiment described with reference to FIG. 3, the different angles 43, 44 result from the diameter 54 of the auxiliary elements 31, 33 and the major axis 50 of the auxiliary elements 32, 34 being specified so as to be of different sizes. For example, the major axis 50 can be specified so as to be at least approximately twice the diameter 54.

Figure 4:
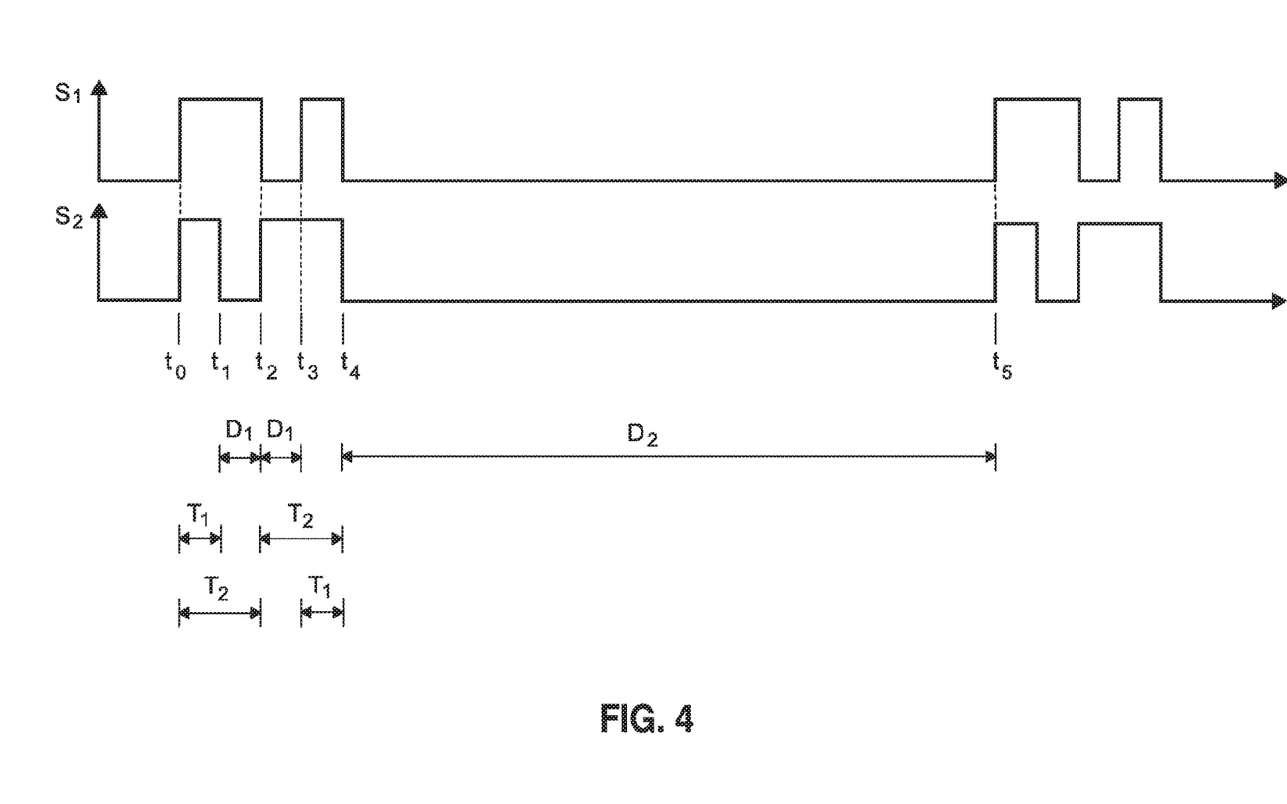
FIG. 4 is a signal diagram for explaining the mode of operation of the invention, corresponding to a possible embodiment of the device for determining the operating state.

FIG. 4 is a signal diagram for explaining the mode of operation of the invention, corresponding to a possible embodiment of the device 2 for determining the operating state of a passenger-transporting system 1. The signal diagram shows an ideal signal $S_1$ that results in the event of a possible rotation of the wheel 10 in the direction of rotation 4A. Correspondingly, the signal $S_2$ results in the event of a rotation in the direction of rotation 3A.

The signal $S_1$ is considered first. At time $t_0$, the auxiliary element 32, for example, reaches the sensing location 38 while a rotation is carried out in the direction of rotation 4A. Thus, from time $t_0$ to time $t_2$, it is observed that the auxiliary element 32 is located at the sensing location 38, and this can be sensed in a manner corresponding to a light barrier. None of the auxiliary elements are at the sensing location 38 between times $t_2$ and $t_3$. The auxiliary element 31 is then located at the sensing location 38 between times $t_3$ and $t_4$. There is no signal between times $t_4$ and $t_5$, and the auxiliary element 34 is then sensed at the sensing location 38 at time $t_5$. This produces, on one occasion, the temporal spacing $D_1$ between times $t_2$ and $t_3$, and, on another occasion, the temporal spacing $D_2$ between the times $t_4$ and $t_5$ between the signals. Since the temporal spacing $D_2$ is greater than the temporal spacing $D_1$, the sensing device 37 identifies that the pulse between time $t_0$ and time $t_2$, and the pulse between time $t_3$ and time $t_4$, are assigned to one another. Moreover, the shorter pulse width $T_1$ follows the longer pulse width $T_2$, from which the sensing device 37 determines the direction of rotation 4A. Moreover, two of the times $t_0$ to $t_5$ can be used to determine a temporal spacing from which the rotational speed of the wheel 10 can be determined. For example, the temporal spacing $D_2$ can be used for a rotational speed determination of this kind. Of course, instead of the rotational speed, the speed of the transporting element 5 can also be determined directly by means of a conversion factor.

In principle, the pulse widths $T_1$ and $T_2$ are also dependent on the rotational speed or the angular speed of the wheel 10. As a result, the pulse widths $T_1$ and $T_2$ also represent the rotational speed, and the speed of the transporting element 5 can be calculated therefrom. Since the two pulse widths $T_1$, $T_2$ are very close together, the speed calculated from the first pulse width $T_1$ can be verified using the speed calculated from the second pulse width $T_2$. For this purpose, a theoretically anticipated second pulse width needs to be calculated from the first pulse width $T_1$ and compared with the actually measured second pulse width $T_2$. If the calculated second pulse width is equal to the measured second pulse width $T_2$, then the speed is constant. If the calculated second pulse width is less than the measured second pulse width $T_2$, then the wheel 10 is accelerating at the time of the measurement. If the calculated second pulse width is greater than the measured second pulse width $T_2$, then the wheel 10 is slowing at the time of the measurement. When configuring the auxiliary elements 31 to 34, care should furthermore be taken to ensure that the angles 43, 44 are sufficiently different that accelerations and slowing of the angular speed do not result in the pulse widths $T_1$ and $T_2$ becoming indistinguishable from one another or simulating an incorrect result or an incorrect direction of rotation.

In the signal $S_2$, the first pulse has already ended at time $t_1$, while at time $t_2$ the next pulse occurs until time $t_4$. Since the temporal spacing $D_2$ that follows the two pulses is greater than the temporal spacing $D_1$ between the pulses occurring between times $t_0$ and $t_4$, the sensing device 37 assigns the two pulses between times $t_0$ and $t_4$ to one another. Since the pulse at time $t_0$ to time $t_1$ has a shorter pulse width $T_1$ than the following pulse of pulse width $T_2$, the direction of rotation 3A is determined.

The sensing device 37 thus assigns two pulses to one another if the temporal spacing $D_1$ of said two pulses is less than the temporal spacing $D_2$ from the following pulse. The mutually assigned pulses are then compared with respect to the pulse width thereof. If a short pulse width $T_1$ follows a long pulse width $T_2$, the direction of rotation 4A results. In the reverse case, the direction of rotation 3A results.

In addition, further information can be computed from the pulse widths $T_2$ or from the temporal spacings $D_1$, $D_2$ or from comparable temporal spacings. In particular, an acceleration or slowing can be calculated. This can be carried out by means of a processing device 20', which can in particular be implemented by the controller 20, when the sensing device 37 transmits the corresponding values. Moreover, numerical analyses that are described as functions as the sensing device can also be implemented entirely or in part by the controller 20 or the processing device 20'.

When dimensioning the arrangement 30 of the auxiliary elements 31 to 34, care should be taken to ensure that the sizes and spacings are determined such that the maximum acceleration or slowing occurring during operation cannot lead to an incorrect direction result. It must therefore still be possible to identify, even during accelerations or slowing, that the temporal spacing $D_2$ is greater than the temporal spacing $D_1$.

Furthermore, a standstill criterion can be implemented. For this purpose, the sensing device 37 can sense the duration during which there is no change at the sensing location 38 and can identify a standstill when a threshold is reached or exceeded.

Moreover, the service brake 19 can be actuated by the obtained information such that the transporting element 5 reaches a specified position at standstill, in particular in the end regions 21, 22.

The invention is not limited to the described exemplary embodiments.

Although the invention has been described through the illustration of specific exemplary embodiments, it is clear that countless additional embodiment variants can be created within the context of the present invention. For example, the optical auxiliary elements can be of any shape, although of course always taking account of the requirements according to the invention that at least two configurations of optical elements be provided that generate signals that can be distinguished from one another or pulses having different pulse widths.

The invention claimed is:

1. A passenger-transporting system comprising:
an arrangement of auxiliary elements; and
at least one sensing device,
wherein the arrangement of the auxiliary elements rotates about an axis of rotation in accordance with a movement of at least one transporting element of the passenger-transporting system,
wherein the arrangement of the auxiliary elements and the at least one sensing device are positioned such that all the auxiliary elements are sensed by a same sensing device of the at least one sensing device and are identified in a same signal curve of the same sensing device of the at least one sensing device, and wherein the at least one sensing device senses whether or not one of the auxiliary elements is currently located at a sensing location,
wherein at least one auxiliary element is configured in a manner corresponding to a first configuration type and at least one second auxiliary element is configured in a manner corresponding to a second configuration type,
wherein the at least one sensing device senses, at least when the arrangement of the auxiliary elements is rotated, whether one of the auxiliary elements located at the sensing location is of the first configuration type or the second configuration type, and wherein, when the arrangement of the auxiliary elements is rotated, the at least one sensing device assigns at least one auxiliary element of the first configuration type and at least one auxiliary element of the second configuration type to one another such that the direction of rotation of the arrangement is determined by sensing an order of the auxiliary elements of the first configuration type and of the second configuration type.

2. The passenger-transporting system according to claim 1, wherein the arrangement of the auxiliary elements is formed by arranging the auxiliary elements on a flywheel of a drive motor or on a wheel of a power train that is driven by at least one of the drive motor or a movement of the transporting element.

3. The passenger-transporting system according to claim 1, wherein the auxiliary elements comprise at least one of: transparent optical auxiliary elements, light-reflecting optical auxiliary elements, depressions, openings, and fitted metal plates.

4. The passenger-transporting system according to claim 1, wherein the at least one transporting element is designed in the form of an elevator car, an escalator step or a moving sidewalk segment.

5. The passenger-transporting system according to claim 1, wherein the arrangement of the auxiliary elements is designed such that the centers of area of the auxiliary elements are arranged at least approximately on a radius or a peripheral line relative to the axis of rotation on which the sensing location is located, and wherein the at least one sensing device is designed such that sensing occurs at the sensing location at a resolution in a peripheral direction that allows the auxiliary elements to be assigned to the first configuration type and to the second configuration type.

6. The passenger-transporting system according to claim 1, wherein the auxiliary elements of the first configuration type and the auxiliary elements of the second configuration type differ by having different extensions in a peripheral direction on a radius or a peripheral line relative to the axis of rotation on which the sensing location is located.

7. The passenger-transporting system according to claim 1, wherein the auxiliary elements are at least approximately circular, and wherein the auxiliary elements of the first configuration type and the auxiliary elements of the second configuration type differ by having different circle radii.

8. The passenger-transporting system according to claim 1, wherein the auxiliary elements of one configuration type are at least elliptical and those of the other configuration type are at least approximately circular, and wherein a major or minor axis oriented in a peripheral direction of the elliptical configuration of the auxiliary elements of one configuration type and a diameter of the auxiliary elements of the other configuration type are specified so as to be of different sizes.

9. The passenger-transporting system according claim 1, wherein, when the arrangement of the auxiliary elements is rotated, the at least one sensing device temporally assigns a first auxiliary element of the first configuration type and a second auxiliary element of the second configuration type to one another, on the basis of temporal spacings between the successive auxiliary elements, in order to determine the direction of rotation of the arrangement.

10. The passenger-transporting system according to claim 9, wherein the at least one sensing device temporally assigns the first auxiliary element and the second auxiliary element to one another such that the second auxiliary element is assigned to a preceding first auxiliary element when the temporal spacing between said first auxiliary element and said second auxiliary element is shorter than the temporal spacing between the second auxiliary element and a following auxiliary element of the first configuration type, and wherein the first auxiliary element is assigned to the preceding second auxiliary element when the temporal spacing between said second auxiliary element and said first auxiliary element is shorter than the temporal spacing between the first auxiliary element and a following auxiliary element of the second configuration type.

11. The passenger-transporting system according to claim 1, wherein a plurality of auxiliary elements of the first configuration type and a plurality of auxiliary elements of the second configuration type are arranged alternately in the peripheral direction.

12. The passenger-transporting system according to claim 11, the arrangement of the auxiliary elements is axisymmetric with respect to the axis of rotation.

13. The passenger-transporting system according to claim 1, further comprising a processing device which is configured to compute information relating to an operating state from temporal spacings between mutually assigned auxiliary elements which are sensed by the at least one sensing device at the sensing location, and/or from temporal spacings between mutually unassigned auxiliary elements that are sensed by the at least one sensing device at the sensing location, wherein the information comprises at least one of: a speed value for the transporting element, an acceleration value for the transporting element, and an item of standstill information relating the transporting element, and wherein the processing device continuously updates said information and/or compares at least two items of information with one another for monitoring purposes.

14. The passenger-transporting system according to claim 13, further comprising:
a service brake; and
a controller that allows the service brake to be actuated, wherein the controller actuates the service brake for a specified braking procedure on the basis of the information determined by the processing device relating to the operating state such that the transporting element stops in a specified position.

15. A method for measuring speed and sensing the direction of travel or sensing the direction of rotation for a passenger-transporting system, the method comprising:
providing a passenger-transporting system comprising
an arrangement of auxiliary elements, and
at least one sensing device,
wherein the arrangement of the auxiliary elements rotates about an axis of rotation in accordance with a movement of at least one transporting element of the passenger-transporting system,
wherein the arrangement of the auxiliary elements and the at least one sensing device are positioned such that all the auxiliary elements are sensed by a same sensing device of the at least one sensing device and are identified in a same signal curve of the same sensing device of the at least one sensing device, and wherein the at least one sensing device senses whether or not one of the auxiliary elements is currently located at a sensing location,
wherein at least one auxiliary element is configured in a manner corresponding to a first configuration type and at least one second auxiliary element is configured in a manner corresponding to a second configuration type,
wherein the at least one sensing device senses, at least when the arrangement of the auxiliary elements is rotated, whether one of the auxiliary elements located at the sensing location is of the first configuration type or the second configuration type, and wherein, when the arrangement of the auxiliary elements is rotated, the at least one sensing device assigns at least one auxiliary element of the first configuration type and at least one auxiliary element of the second configuration type to one another such that the direction of rotation of the arrangement is determined by sensing an order of the auxiliary elements of the first configuration type and of the second configuration type;
sensing whether or not one of the auxiliary elements is currently located at the sensing location,
sensing whether one of the auxiliary elements currently located at the sensing location is of a first configuration type or of a second configuration type,
assigning at least one auxiliary element of the first configuration type and at least one auxiliary element of the second configuration type to one another when the arrangement of the auxiliary elements is rotated, and
determining the direction of rotation of the arrangement of the auxiliary elements from the sequence in which the auxiliary element of the first configuration type and the auxiliary element of the second configuration type, which elements are assigned to one another, are sensed.

16. The passenger-transporting system according to claim 1, wherein the passenger transporting system comprises an elevator, an escalator or a moving sidewalk.

17. The passenger-transporting system according to claim 1, wherein the at least one sensing device is designed to sense the auxiliary elements inductively.

18. The passenger-transporting system according to claim 1, wherein the auxiliary elements are at least approximately elliptical, and wherein the auxiliary elements of the first configuration type and the auxiliary elements of the second configuration differ by having different major and minor axes that are oriented in the peripheral direction.

* * * * *

UNITED STATES PATENT AND TRADEMARK OFFICE
CERTIFICATE OF CORRECTION

PATENT NO. : 10,294,080 B2
APPLICATION NO. : 15/758562
DATED : May 21, 2019
INVENTOR(S) : Ivo Lustenberger

Page 1 of 1

It is certified that error appears in the above-identified patent and that said Letters Patent is hereby corrected as shown below:

In the Claims

Column 15, Line 12, in Claim 9, after "according" insert --to--.

Signed and Sealed this
Tenth Day of September, 2019

Andrei Iancu
*Director of the United States Patent and Trademark Office*